United States Patent

Bryant et al.

[15] 3,679,917

[45] July 25, 1972

[54] INTEGRATED CIRCUIT SYSTEM HAVING SINGLE POWER SUPPLY

[72] Inventors: Richard W. Bryant, Poughkeepsie; George K. Tu, Wappingers Falls, both of N.Y.

[73] Assignee: Cogar Corporation, Wappingers Falls, N.Y.

[22] Filed: May 1, 1970

[21] Appl. No.: 33,671

[52] U.S. Cl. ..............................307/297, 307/213, 307/215, 307/218, 307/237, 307/310, 330/30 D

[51] Int. Cl. ......................................H03k 1/14, H03k 19/30

[58] Field of Search ..................307/203, 207, 213, 214, 215, 307/218, 237, 297, 310, 289; 328/92, 93, 94; 330/23, 30 D

[56] References Cited

UNITED STATES PATENTS

| | | | |
|---|---|---|---|
| 3,259,761 | 7/1966 | Narud et al. | 307/203 X |
| 3,482,111 | 12/1969 | Gunderson et al | 307/203 |
| 3,515,899 | 6/1970 | May | 307/214 X |
| 3,394,268 | 7/1968 | Murphy | 307/215 |
| 3,396,282 | 8/1968 | Sheng et al | 307/215 X |
| 3,515,899 | 6/1970 | May | 308/237 X |

OTHER PUBLICATIONS

Millman & Taub, Pulse Digital and Switching Waveforms, p. 182- 183, McGraw-Hill Book Company, 1965

Cavaliere, " Nonlinear Resistor for Collector Clamping," IBM Technical Disclosure Bulletin, P. 328, Vol. 9, No. 3, 8/1966.

*Primary Examiner*—Donald D. Forrer
*Assistant Examiner*—L. N. Anagnos
*Attorney*—Harry M. Weiss

[57] ABSTRACT

An integrated circuit system having a single power supply. Rather than using multiple voltage sources, a single voltage source is used from which multiple reference voltages are derived. Multiple reference voltages can be used due to the incorporation of temperature compensation circuits.

31 Claims, 5 Drawing Figures

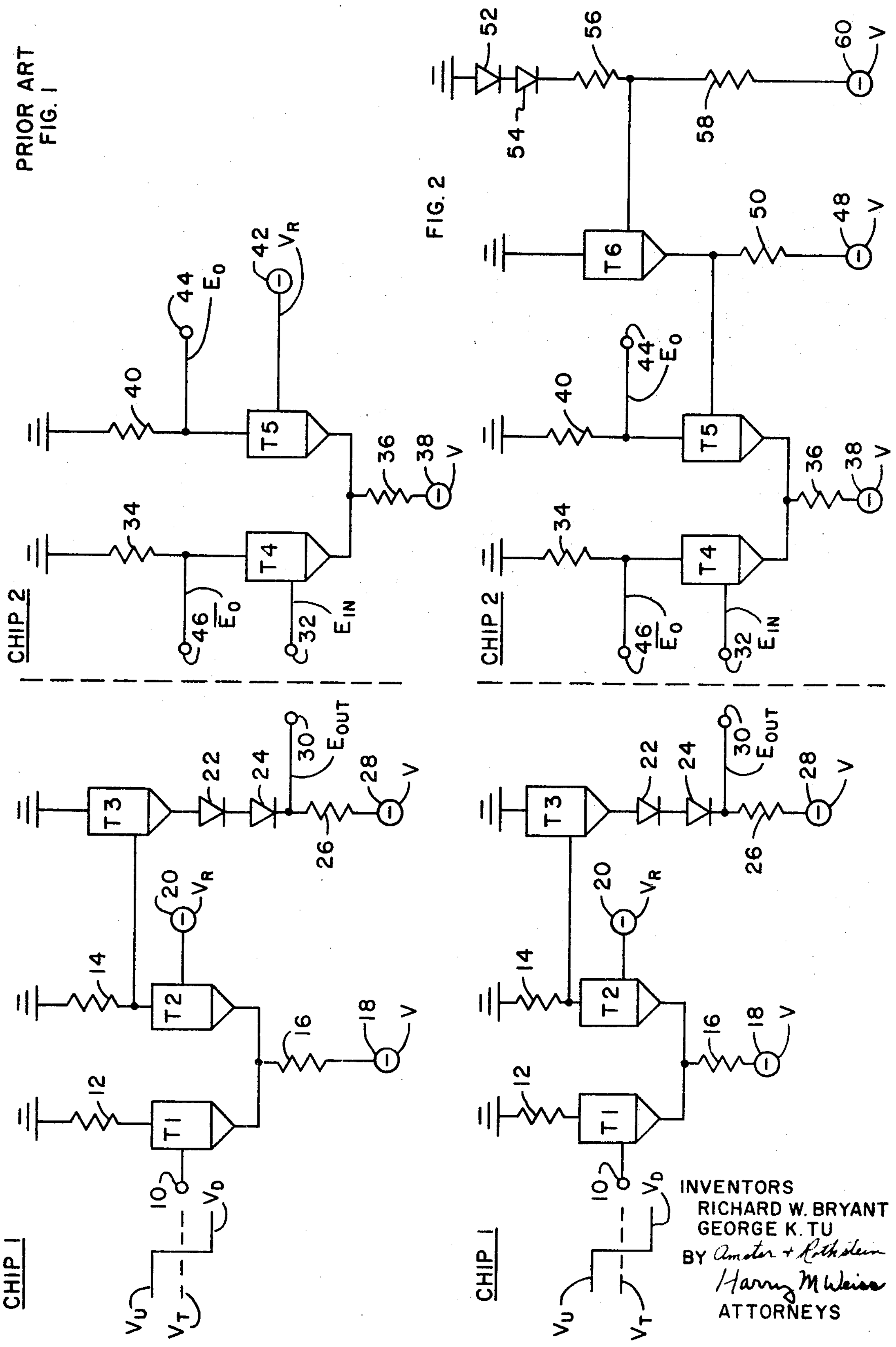
PRIOR ART FIG. 1, FIG. 2
INVENTORS
RICHARD W. BRYANT
GEORGE K. TU
BY Amster + Rothstein
Harry M Weiss
ATTORNEYS

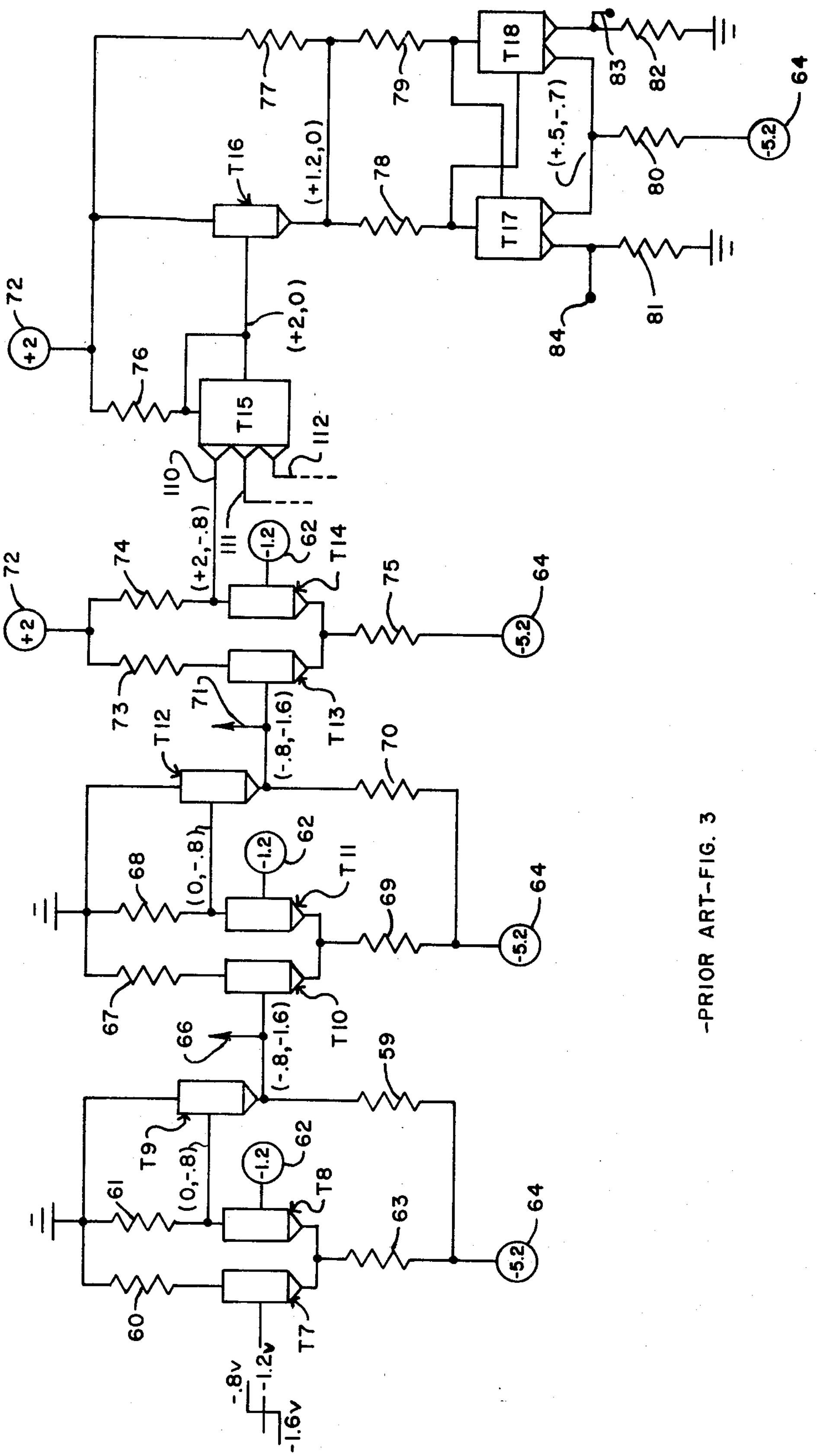
PRIOR ART-FIG. 3

INTEGRATED CIRCUIT SYSTEM HAVING SINGLE POWER SUPPLY

This invention relates to integrated circuit systems, and more particularly to such systems which utilize a reduced number of voltage sources.

In a conventional integrated circuit system, such as an emitter-coupled logic (ECL) integrated circuit system, a single reference voltage is generally provided together with multiple system supplies. Different system supplies are required to avoid saturation of cascaded stages in the system. Great cost savings can be realized however, if the system requires only a single system supply, this supply serving to power all of the logic, memory and associated components. This has heretofore not been feasible because, as is known to those skilled in the art, as the number of supply voltages is reduced, it is generally necessary to provide additional reference voltages. And with the use of multiple reference voltages, it is found that temperature variations can cause the system to malfunction because of increasing voltage variations in succeeding stages.

It is a general object of our invention to provide an integrated circuit system which utilizes a reduced number of system supplies and multiple reference voltages.

In our copending application, Ser. No. 32,922, filed on Apr. 29, 1970, there is disclosed a temperature compensation technique for ECL integrated circuits. In a typical ECL circuit, a two-level input signal is applied to the base of one of two paired transistors. A reference voltage is applied to the base of the other transistor. An output of the paired transistors varies between two levels in accordance with the relative magnitudes of the input signal levels and the reference voltage. Although both input signal levels can vary in accordance with temperature, in our copending application there is disclosed a technique for similarly varying the reference voltage level. By providing such temperature compensation, it is possible to design logic circuits which have small signal swings yet interface with each other, and are capable of high switching speeds over relatively large temperature ranges.

In accordance with the principles of the present invention, a similar technique is utilized in the design of an overall system such that only a limited number of system power supplies are required. (A single system supply is required in the illustrative embodiment of the invention.) Several reference voltages are derived from the single system supply with the use of resistor-diode dividers. The number of diodes in each divider depends upon the number of diode drops in the logic stage whose output feeds the same stage to which the reference voltage is coupled. The nominal reference voltage for each stage is determined by a resistor-divider network. The diodes in each reference supply serve to vary the reference voltage in accordance with temperature in the same way that the input signal to the same stage from the previous stage varies in accordance with temperature. This permits the use of a single system supply voltage independent of the specific input level requirements of the various stages.

It is a feature of our invention to utilize a reduced number of system power supplies (a single system supply is utilized in the illustrative embodiment of the invention) and a multiple number of reference voltages, with each reference voltage being temperature-compensated to prevent erroneous operation of logic stages due to temperature variations.

Further objects, features and advantages of our invention will become apparent upon consideration of the following detailed description in conjunction with the drawing, in which:

FIGS. 1 and 2 are the same as FIGS. 1 and 2 in our copending application, FIG. 1 depicting a typical prior art ECL integrated circuit and FIG. 2 depicting a temperature compensation circuit therefor;

FIG. 3 illustrates a typical prior art single reference voltage, multiple power supply system.

Figure 4:
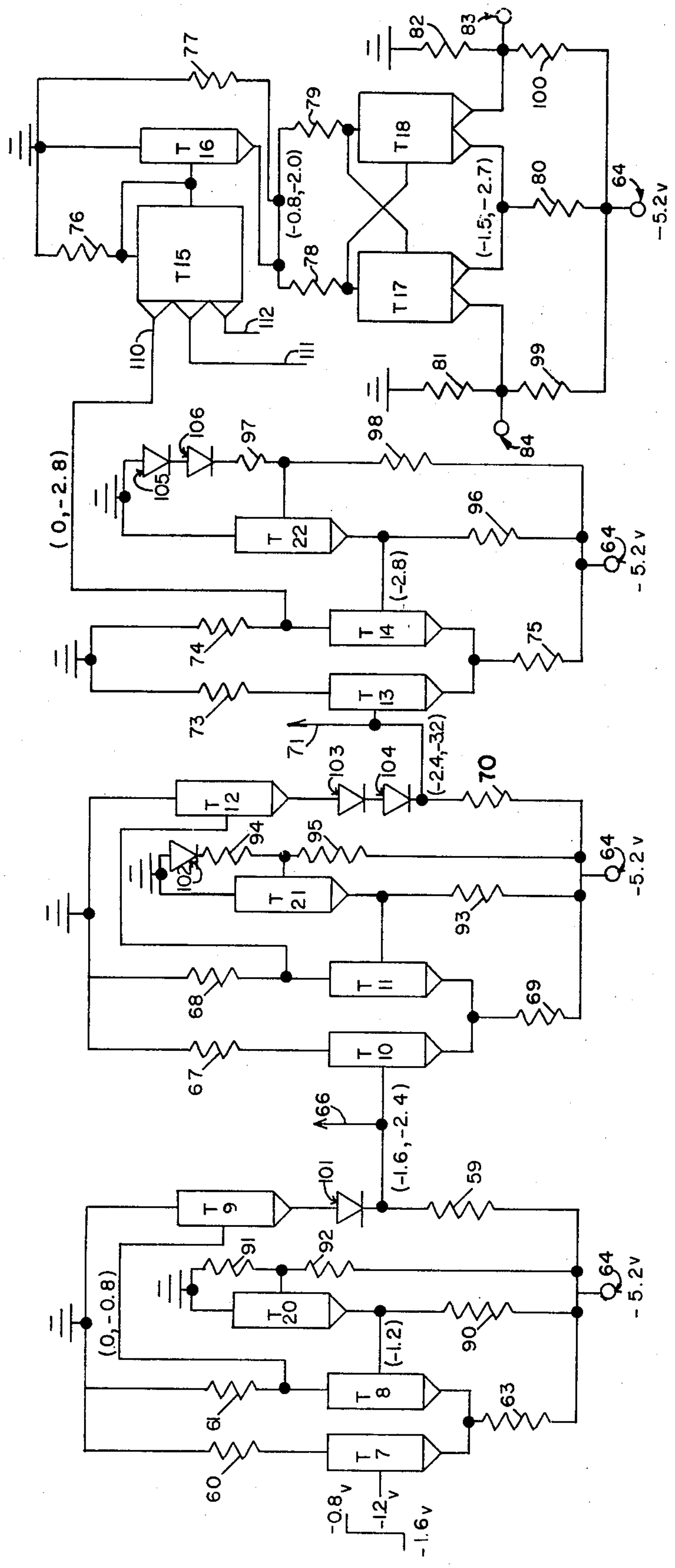
FIG. 4 depicts a first illustrative embodiment of our invention — a single voltage supply, multiple reference source system.

FIG. 1 depicts two chips. Although the invention of our copending application is applicable to ECL circuits all on the same chip, as will be described below, the problem toward which the invention of our copending application is directed is more severe in the case of different chips connected to each other. On chip 1 in FIG. 1, transistors T1, T2 form a current switch, the emitters of the two transistors being extended through resistor 16 to negative potential source 18 of magnitude V. The collectors of the two transistors are extended through respective resistors 12, 14 to ground. The input signal is applied to terminal 10, connected to the base of transistor T1. The input signal varies between upper and lower levels $V_U$ and $V_D$. The threshold level $V_T$ is centered between the upper and lower levels.

A reference source 20 of magnitude $V_R$ (equal to $V_T$) is connected to the base of transistor T2. (The reference voltage is typically derived from the source of magnitude V through a voltage divider network; the effect is the same as using a separate reference source.) The collector of the transistor, the output of the current switch, is connected to the base of transistor T3. The emitter of transistor T3 is connected through diodes 22,24 and resistor 26 to negative source 28 of magnitude V. The output signal $E_{out}$ at terminal 30 is taken from the junction of diode 24 and resistor 26.

If the input signal is at level $V_U$, transistor T1 conducts and the voltage developed across resistor 16 turns off transistor T2. (In the case of a large resistor 16, which effectively functions as a current source, all of the current of the source flows through transistor T1 and transistor T2 thus does not conduct.) The collector of transistor T2 rises in potential and increases the forward bias across the base-emitter junction of transistor T3. The transistor current is at its maximum design level and the voltage at terminal 30 is similarly at a maximum. On the other hand, if the input signal is at the lower level $V_D$, transistor T2 conducts rather than transistor T1, the collector of transistor T2 is at a more negative potential, and the current through transistor T3 is at the minimum design level. In such a case, the output signal at terminal 30 is at a minimum.

Ideally, the magnitude of reference voltage $V_R$ is the same as threshold voltage $V_T$. In such a case, the upper input signal level causes transistor T1 to conduct and transistor T2 to turn off, while the lower input level causes transistor T2 to conduct and transistor T1 to turn off. The function of diodes 22,24 is to lower the signal which appears at terminal 30. When transistor T1 conducts, the emitter current of transistor T3 flows through transistor T3, the two diodes and resistor 26. Were the two diodes not included, when the input signal would be at the upper level $V_U$, the output signal at terminal 30 would be only slightly lower than ground. To make the output signal at terminal 30 compatible with another current switch (on chip 2) to which it is fed, the upper level (and therefore the lower level as well) at the output is lowered by the drops across the two diodes.

Since the magnitude of resistor 14 is typically quite low, when transistor T3 conducts, the output at terminal 30 is approximately equal to the drops across diodes 22 and 24 and the base-emitter junction of transistor T3. Typically, the temperature coefficient of each of the two diodes and the base-emitter junction of the transistor (which in effect is also a diode) is approximately −2mv/°C. Thus, the temperature coefficient for the three elements in series is approximately −6mv/°C. In the case of a system designed to operate over a temperature range of 90° C, it is apparent that the signal (at either level) at terminal 30 can vary by as much as 540 mv as the temperature of the circuit varies. The difference between levels $V_U$ and $V_D$ at the input is typically less than one volt. If the voltage swing at terminal 30 is used to drive a succeeding current switch, it is apparent that a change in $E_{out}$ by as much as 540 mv as the result of a temperature change may cause both levels at terminal 30 to be above (or below) the reference voltage which controls the switching of the succeeding current switch. In such a case, the output of this succeeding current switch does not change in accordance with the input signal initially applied at terminal 10.

Such a succeeding current switch is shown in FIG. 1 as being contained on chip 2. Input terminal 32 is connected to output terminal 30 on the first chip via some external conductor. (Obviously, the same problem in inherent in the case of a succeeding current switch contained on the same chip, although as will be described below, it is more severe in the case of different chips.) The base of transistor T5 is connected to a voltage source 42 of magnitude $V_R$. The input signal ($E_{in}$) applied to the base of transistor T4 is the same as the output signal $E_{out}$ derived by the circuit shown on chip 1. Since the emitters of transistors T4, T5 are coupled through resistor 36 to potential source 38, and the two collectors are connected through respective resistors 34,40 to ground, it is apparent that complementary output signals $E_O$ and $\overline{E}_O$ appear on output terminals 44,46.

If the input signal at terminal 32 is high, corresponding to upper level $V_U$ at terminal 10, the $E_O$ signal is similarly high and the $\overline{E}_O$ signal is low. On the other hand, if the input signal at terminal 10 is at level $V_D$, the $\overline{E}_O$ signal is high and the $E_O$ signal is low. This is true, however, only if the output signal at terminal 30 (the input signal at terminal 32) switches between two levels which are above and below reference level $V_R$. If the temperature of the circuit is too high, the drops across the base-emitter junction of transistor T3 and diodes 22 and 24 are significantly reduced. In such a case, both signal levels at terminal 30 are raised. One of the advantages of an ECL circuit is that because none of the transistors saturate, the circuit can operate at a high speed. But too high a potential at terminal 30 for the upper level can result in the saturation of transistor T4. As for the lower level, if the drops across the base-emitter junction of transistor T3 and diodes 22 and 24 are so low as the result of a temperature increase that the potential at terminal 30 actually rises above level $V_T$ ($V_R$), the lower level at terminal 32 may be above the reference voltage of source 42, and there will be no change in the complementary outputs $E_O$ and $\overline{E}_O$. It is possible to design the circuit such that the lower level input at terminal 10 causes transistor T3 to cease conducting altogether. In suc h a case, the output potential at terminal 30 would be clamped to the negative potential of source 28. However, while this would insure that the lower output level would be below the reference voltage of source 42, the output voltage swing at terminal 30 would be much larger than it would otherwise have to be, resulting in increased power dissipation. Also, this would not lower the "too-high" upper level at terminal 30.

Various techniques have been proposed in the prior art to increase the temperature range over which an ECL circuit can be operated. One technique is to omit diodes 22 and 24 (or however many diodes are used to decrease both levels at terminal 30 in order that the output signal at this terminal be compatible with a succeeding current switch) which gave rise to the problem in the first place. If this is done, however, it is apparent that the reference voltage of potential source 42 must be increased in order that it fall between the two possible signal levels at terminal 30, and the upper level at terminal 30 is closer to ground that it otherwise would be. There is thus less of a possible upswing at terminals 44 and 46. It is also possible to increase the voltage swing at terminal 30 by a judicious choice of impedance magnitudes for the circuit on chip 1 (which would insure that even at increased temperatures the lower level is below $V_R$). But this results in greater power dissipation and reduced speed.

It is also apparent why the problem is more severe in the case of current switches contained on different chips. Depending on how the chips were fabricated, it is possible for the diode drops (and the base-emitter drop of transistor T3) to each be up to 50 mv greater on one chip than on another. Thus, it is possible for the signal at terminal 30 to vary by as much as 150 mv in the case of two chips containing the same circuit. This difference exists even before temperature complications. If either chip is to feed the circuit on chip 2, it is apparent that temperature-caused level changes must be reduced even further.

In the illustrative embodiment of the invention of our copending application, depicted in FIG. 2, voltage reference source 42 is replaced by two diodes 52,54, resistors 56,58, transistor T6 and resistor 50. This arrangement causes the reference voltage applied to the base of transistor T5 to increase with increasing temperature. Instead of trying to prevent variations in the signal levels at terminal 30, the signal levels are permitted to change with temperature. But what is done is to cause the reference voltage at the base of transistor T5 to change in the same direction. In such a case, the upper level at terminal 30 is always greater than the reference voltage at the base of transistor T5 while the lower level is always below it, no matter how the two levels change with temperature. (It is to be understood that if a similar problem exists on chip 1 itself, that is, if levels $V_U$ and $V_D$ change with temperature, then instead of using a fixed reference voltage source 20, it is possible to use another temperature dependent source. The temperature dependent reference voltage can be used wherever the two signal levels at one input of a current switch, or comparator, change with temperature relative to the reference voltage applied to the other input of the switch.)

Current flows from ground through diodes 52,54, and resistors 56,58, to negative source 60. The base of transistor T6 is connected to the junctions of resistors 56 and 58, the base-emitter junction of the transistor is forward-biased and current flows from ground through the transistor and resistor 50 to negative source 48. The potential at the emitter of the transistor serves as the reference voltage for transistor T5. The reference voltage is equal to the sum of the voltage drops across diodes 52 and 54, resistor 56 and the base-emitter junction of transistor T6.

Any change in temperature affects the voltage drops across the two diodes and the base-emitter junction. Due to the voltage divider relationship of resistors 56 and 58, the change in the voltage at the base of transistor T5 equals the change in the base-emitter voltage drop of transistor T6 plus the sum of the diode voltage-drop changes, multiplied by the ratio of the magnitude of resistor 58 to the sum of the magnitudes of resistors 56 and 58. If resistor 58 is much larger in magnitude than resistor 56, then to a good approximation the reference voltage varies as the sum of the changes in the voltage drops across the two diodes and the base-emitter junction of the transistor. Referring to chip 1, it will be recalled that the signal at terminal 30 varies with temperature in accordance with variations in the potential drops across diodes 22 and 24 and the base-emitter junction of transistor T3. It is apparent that the reference potential at the base of transistor T5 varies in precisely the same way — it changes in accordance with the sum of the changes in drops across two diodes and a base-emitter junction. Since the two chips are generally at roughly the same temperature in any system in which they are interconnected, it is apparent that the two signal levels at terminal 32, while they may change with temperature, change in the same direction and to the same extent as the reference voltage coupled to the base of transistor T5. The close matching between the circuits allows them to be operated over a wide temperature range, while at the same time allowing small signal swings and high switching speeds.

The number of diodes used in the temperature compensation circuit is, of course, dependent on the number of diodes (such as 22 and 24) used to drop the signal level at terminal 30. In general, the temperature compensation circuit for deriving the reference voltage for any current switch is designed to have the same number of active elements as the output stage of the preceding current switch in order that temperature-induced voltage variations be the same in all circuits. It is possible in the circuit of FIG. 2 to use three diodes, rather than two diodes and a transistor, in the temperature compensation circuit since the voltage drop across the third diode will generally be the same as the drop across the base-emitter junction of transistor T6. However, it is preferable to use a transistor rather than a third diode because of the current amplification provided by the transistor. The reference voltage at the emitter of transistor T6 can be coupled to many current switches. The use of the transistor permits fan-out so that the same compensation circuit can be used for a number of current switches.

FIG. 3 depicts a typical prior art integrated circuit system. An input signal is applied to the base of transistor T7, the input signal varying between −0.8 and −1.6 volts, about a threshold level of −1.2 volts. A −1.2 volt reference source 62 is applied to the base of transistor T8, transistors T7 and T8 being coupled through resistor 63 to negative system source 64 having a value of −5.2 volts. The collectors of transistors T7 and T8 are extended through respective resistors 60 and 61 to ground. The voltage at the collector of transistor T8 varies between ground and −0.8 volts, as shown in the drawing, depending upon the level of the input.

The collector of transistor T8 is coupled to the base of transistor T9, whose emitter is returned through resistor 59 to system supply 64. The potential at the emitter of transistor T9 is at a level of −0.8 volts or −1.6 volts, depending upon the level of the input signal at the base of transistor T7. The emitter output of transistor T9 is fanned-out to several circuits in the system through line 66. A single such circuit is shown as comprising transistors T10, T11 and T12. This circuit is identical to the circuit comprising transistors T7, T8 and T9. The same reference voltage source 62 is utilized as is the same system supply 64. The voltage at the collector of transistor T11 varies between ground and −0.8 volts, and the voltage at the emitter of transistor T12 varies between −0.8 and −1.6 volts. Resistors 67, 68, 69 and 70 are comparable to resistors 60, 61, 63 and 59 of the first stage. An additional level of fan-out is shown by line 71.

It is assumed that the signal at the emitter of transistor T12 is required to control the driving of one of the emitters of transistor T15, this transistor having a number of emitter input conductors 110, 111 and 112. The base of the transistor is coupled through resistor 76 to system supply 72, having a value of 2 volts. The collector of the transistor is connected to the base of the transistor so that the transistor functions as a diode matrix.

If all of the emitters of transistor T15 are at the high potential of 2 volts, the transistor does not conduct and the base (collector) terminal is at the 2 volt potential of supply 72. On the other hand, if at least one of the emitters is at the low potential of −0.8 volts, the base (collector) terminal of transistor T15 drops to ground. The collector of transistor T15 is coupled to the base of transistor T16. Resistor 77 is connected between the 2 volt supply 72 and the emitter of transistor T16. The emitter of this transistor is connected through resistors 78 and 79 to the collectors of transistors T17 and T18. These transistors function as a direct-coupled bistable multivibrator as is known in the art. One emitter of each of these two transistors is extended through resistor 80 to system supply 64. Each of the other emitters is connected through a respective one of resistors 81 and 82 to ground, and is also extended to one of output terminals 84 and 83. As long as transistor T15 remains conducting, the potential of the junction of resistor 80 and the joined emitters of transistors T17 and T18 is at −0.7 volts. On the other hand, when transistor T15 turns off, the potential at the junction of the two emitters rises to +0.5 volts. As is known in the art, a bit/sense line can be connected to each of terminals 83 and 84. When transistor T15 is turned off, the two output terminals are accessible for reading or writing purposes. Depending on which of the terminals is pulsed, the multivibrator can be set in one of the two possible states when it is necessary to change the state of the multivibrator. In addition, either terminal can be sensed when transistor T15 does not conduct in order to determine the state of the multivibrator for reading purposes. When transistor T15 conducts, no information can be written into the multivibrator, nor can any information be read out of it.

In the system of FIG. 3, two system supplies are required; system supply 64 has a value of −5.2 volts and system supply 72 has a value of 2 volts. It would be preferable to utilize ground as one of the supply sources for the bistable multivibrator in order that the second supply voltage not be necessary. However, this is not possible. The emitter of transistor T12 cannot drive one of the emitter terminals of transistor T15 directly because each driver of transistor T15 must "accept" current in its "down" state whereas transistor T12 "supplies" current in both of its states. For this reason, the buffer stage including transistors T13 and T14 is provided. The reference voltage for transistor T14 is the single reference voltage of the system, −1.2 volts. It is not possible to design a buffer stage utilizing a reference voltage of −1.2 volts whose output signal levels vary between ground and −2.8 volts, the two signal levels required to drive transistor T15 if ground is to be used rather than supply 72 (as will become apparent below upon a consideration of FIG. 4). This is due to the fact that the more negative signal level at the collector of transistor T14 would be less than the reference voltage of −1.2 volts by 1.6 volts and this cannot be achieved. It is for this reason that with the buffer stage comprising transistors T13 and T14, an additional system voltage of +2 volts is required.

In the system of FIG. 4, diode 101 is connected between the emitter of transistor T9 and resistor 59. The diode provides a drop of 0.8 volts, and thus the voltage extended to the base of transistor T10 varies between −1.6 and −2.4 volts, rather than between −0.8 and −1.6 volts as in the system of FIG. 3. This voltage translation is provided to insure that transistor T10 does not saturate.

The reference voltage of −1.2 volts at the base of transistor T8 is derived from resistors 90, 91 and 92, together with transistor T20. The potential at the junction of resistors 91 and 92 is −0.4 volts; the additional 0.8 volt drop across the emitter-base junction of transistor T20 brings the reference voltage at the base of transistor T8 to −1.2 volts. Although a simple resistor divider network could be used to derive the −1.2 volt reference, it is assumed that the input signal at the base of transistor T7 is derived from a circuit having a single diode (or base-emitter junction) in the output stage; the temperature compensation provided by transistor T20 allows the reference voltage for the stage comprising transistors T7 and T8 to track the threshold level of the input signal as it varies with temperature.

In the circuit of FIG. 3, the reference voltage applied to the base of transistor T11 is that of the single reference supply, −1.2 volts. But the signal level at the base of transistor T10 in the circuit of FIG. 4 varies between −1.6 and −2.4 volts. For this reason, it is necessary to provide a reference voltage of −2.0 volts at the base of transistor T11. This reference voltage could be derived from the −5.2 volt system supply with the use of a resistor divide network but were this done the reference voltage would not vary with temperature, while both signal levels at the base of transistor T10 would rise with an increase in temperature. For this reason, the reference voltage for transistor T11 in the system of FIG. 4 is derived from the network including resistors 93, 94 and 95, diode 102 and transistor T21. The drop across diode 102 is 0.8 volts and resistors 94 and 95 have a magnitude ratio such that the base of transistor T21 is at a potential of −1.2 volts. The 0.8 volt drop across the base-emitter junction of transistor T21 provides a reference voltage at its emitter of −2.0 volts. The reference voltage is derived through two diodes (diode 102, and the base-emitter junction of transistor T21). The input signal at the base of transistor T10 is similarly derived through two diodes (diode 101 and the base-emitter junction of transistor T9). This insures that the reference voltage at the base of transistor T11 tracks the threshold level of the input signal at the base of transistor T10 as the latter varies with temperature.

The signal at the collector of transistor T11 varies between ground and −0.8 volts, just as does the signal at the collector of transistor T8. However, transistor T12 and diodes 103 and 104 translate the signal to levels of −2.4 and −3.2 volts, since each of the diodes and the base-emitter junction of the transistor provides a 0.8 volt drop. The signal at the junction of diode 104 and resistor 70 is coupled to the base of transistor T13 as well as to other circuits as shown at 71.

The reference voltage required at the base of transistor T14 is −2.8 volts, the threshold level of the input signal at the base of transistor T13. The reference voltage is derived by the network including resistors 96, 97 and 98, diodes 105 and 106, and transistor T22. The drops across diodes 105 and 106 are each 0.8 volts, as is the drop across the base-emitter junction of transistor T22, for a total drop of 2.4 volts. Resistors 97 and 98 have relative magnitudes such that the drop across resistor 97 is 0.4 volts. The reference voltage is derived through three diodes (diodes 105 and 106, and the base-emitter junction of transistor T22). Three diodes are used because the up-level of the input signal to the base of transistor T13 is similarly derived through three diodes (diodes 103 and 104, and the base-emitter junction of transistor T12). This insures that the reference voltage at the base of transistor T14 tracks the threshold voltage of the input signal at the base of transistor T13.

The signal at the collector of transistor T14 now varies between ground and −2.8 volts, as opposed to +2 and −0.8 volts as in the system of FIG. 3. Referring to FIG. 3., it will be noted that resistor 76 is returned to a system supply of 2 volts, and that the two signal levels on conductor 110 are equal to this system supply voltage and a voltage lower than it by −2.8 volts. Since resistor 76 in the system of FIG. 4 is returned to ground rather than to a supply of 2 volts, it is apparent that signal levels of ground and −2.8 volts on conductor 110 determine the operation of decoder T15 and the multivibrator in the same way that the two higher-level signals determine their operation in the system of FIG. 3. The only differences are that both signal levels at the emitter of transistor T16 in the system of FIG. 4 are 2 volts lower than the equivalent signal levels in the system of FIG. 3. Similar remarks apply to the two signal levels at the junction of resistor 80 and the interconnected emitters of transistors T17 and T18.

Since the signal levels at the interconnected emitters are both 2 volts more negative than the comparable signal levels in the system of FIG. 3, it is necessary to similarly shift the bias voltages at the other emitters of transistors T17 and T18. For this reason, resistors 99 and 100 are provided for connecting these other emitters to system supply 64. Resistors 99 and 100 have magnitudes such that the bias voltages at terminals 83 and 84 are both at −2 volts.

Figure 5:
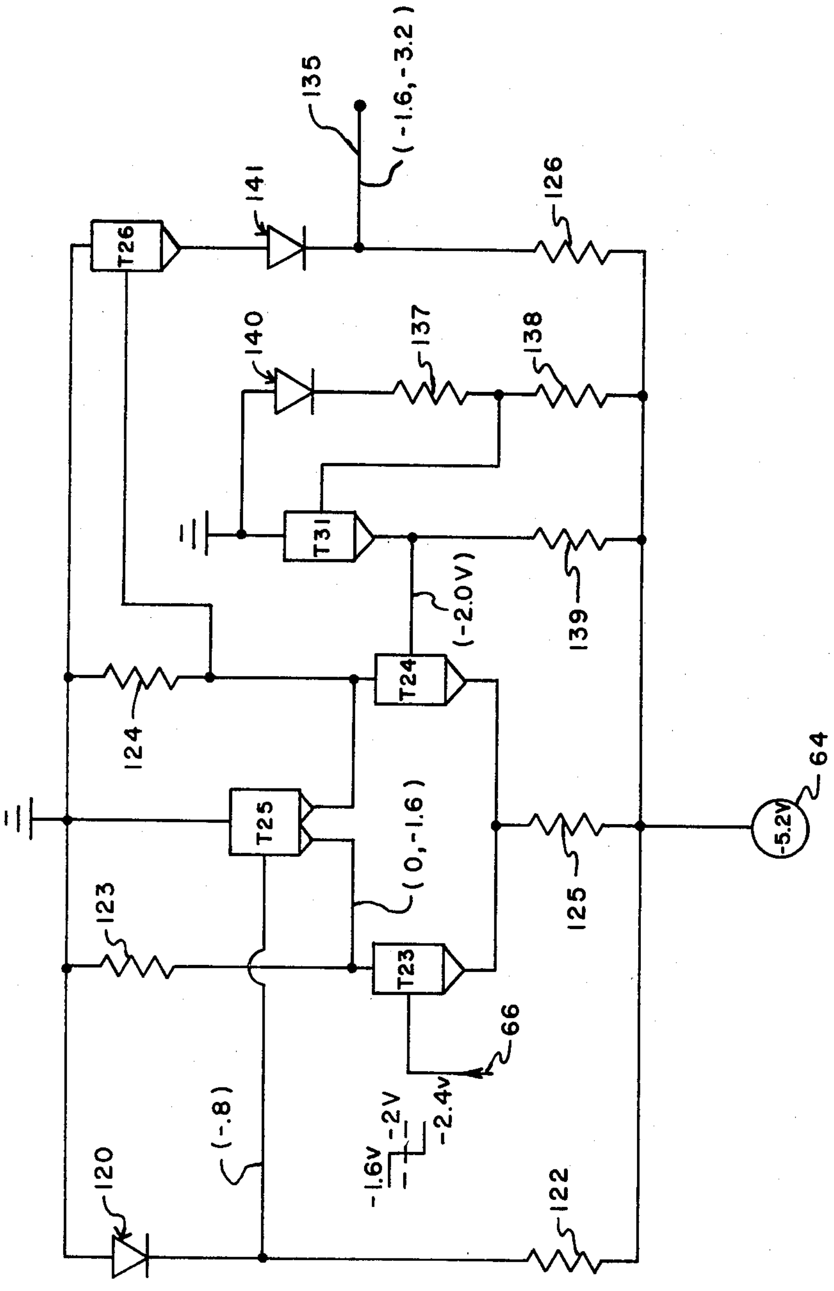
FIG. 5 depicts a clamp circuit which incorporates the principles of our invention.

The circuit of FIG. 5 illustrates another situation in which it is desirable to derive a temperature-compensated reference voltage. Transistors T23 and T24, together with resistors 123, 124 and 125, comprise an ECL stage whose input at the base of transistor T23 varies between −1.6 and −2.4 volts. In this circuit, the input signal is derived from line 66 of FIG. 4, the output stage including two diodes T9 and 101 (just as the output of the circuit of FIG. 5 on conductor 135 is derived through two diodes). For this reason, the reference voltage at the base of transistor T24, −2.0 volts, is derived through two diodes, diode 140 and the base-emitter junction of transistor T31. The network for deriving the reference voltage, which also includes resistors 137, 138 and 139 is the same as the network in FIG. 4 which derives the reference voltage at the base of transistor T11. The output signal at the collector of transistor T24 is extended to the base of transistor T26 so that the output signal is translated by two diode drops (the base-emitter junction of transistor T26 and diode 141) from levels of ground and −1.6 volts to levels of −1.6 and −3.2 volts.

The use of a clamping transistor T25 is known in the art. In the prior art, the base of transistor T25, when used in a circuit such as that of FIG. 5, would be coupled to a fixed reference voltage of −0.8 volts. Since both base-emitter drops of transistor T25 are 0.8 volts, the potential at that one of the two emitters of the transistor which is connected to the conducting one of transistors T23 and T24 cannot fall below −1.6 volts. This insures that the collector of the conducting transistor does not fall below −1.6 volts with the possibility of thus saturating the conducting transistor.

However, in the case where the input signal to transistor T23 is derived through two diodes in the output stage of the preceding circuit, the input signal level rises with temperature in accordance with the decreased drops across two diodes. The same change in temperature reduces the base-emitter drop of transistor T25, but the collector clamping voltage of transistor T23 rises an amount equal to only the decreased drop through one diode (base-emitter junction of transistor T25). It is thus possible, in the case of an increase in temperature, for the base voltage of transistor T23 to rise too high relative to the collector voltage, thus saturating the transistor.

This is avoided in the circuit of FIG. 5 by deriving the reference voltage for transistor T25 through a temperature-compensated circuit. Diode 120 is connected in series with resistor 122 between ground and system supply 64. Since the drop across the diode is 0.8 volts, the base of transistor T25 is held at the −0.8 volt potential described above. Now, however, with an increase in temperature, the collector clamping potential of transistor T23 rises the same amount as does the base potential of the same transistor. An increase in temperature reduces the drop across diode 120, as well as the drop across the base-emitter junction of transistor T25. The emitter of transistor T25 is thus brought closer to ground by an amount equal to the decrease in the drops across two diodes. The increase in the collector clamping voltage of transistor T23 is thus the same as the increase in the base voltage for transistor T23, and even in the case of a high input level the transistor cannot saturate.

It should be noted that in the circuit of FIG. 5 the reference voltage for the clamping circuit which is derived is different from all of those shown in the circuit of FIG. 4. FIG 5 simply illustrates another example in which a desired reference voltage may be derived from a single system power supply. The circuit is particularly advantageous in that it prevents the saturation of transistor T23 with an increase in temperature and thus allows the system to operate at high speed even at high temperatures.

Although the invention has been described with reference to particular embodiments, it is to be understood that these embodiments are merely illustrative of the application of the principles of the invention. For example, the system disclosed in FIG. 4 is preferably contained within a single chip and is therefore fabricated in one monolithic integrated semiconductor structure.

The practice of the present invention entails the use of a single system power supply to power logic, memory or other circuits in which at least two reference voltages are derived from the same system supply, with each reference voltage being temperature-compensated. It is possible to utilize the principles of the present invention even in systems having multiple system power supplies, provided at least one of the power supplies is used to power a number of logic, memory or other types of circuits and provided such circuits have coupled to them at least two reference voltages which are derived from the system power supply and are temperature-compensated. Thus it is to be understood that numerous modifications may be made in the illustrative embodiments of the invention and other arrangements may be devised without departing from the spirit and scope of the invention.

What we claim is:

1. An integrated circuit system comprising a single system power supply, a plurality of circuits all coupled to said single system power supply and being powered thereby, at least two of said circuits being fed by input signals from others of said circuits which input signals vary between two discrete levels both of which change in the same direction with a change in temperature each of said at least two circuits having two input terminals and at least one output terminal, means for feeding the input signal to each of said at least two circuits to one of the input terminals thereof such that the signal developed by each of said at least two circuits at the output terminal thereof is at one of two levels dependent upon the relative magnitudes of the signals at said two input terminals, and at least two means for deriving at least two different reference voltages from said single system power supply for application to respective ones of the second input terminals of said at least two circuits which reference voltages change with temperature in the same direction as the two discrete input signal levels fed to each of said at least two circuits.

2. An integrated circuit system in accordance with claim 1 wherein each of said at least two reference voltage deriving means includes at least one diode and one resistor connected in series across said single system power supply.

3. An integrated circuit system in accordance with claim 2 wherein each of said at least two reference voltage deriving means further includes a transistor having a base-emitter junction connected between the second input terminal of the respective one of said at least two circuits and said series-connected resistor and diode.

4. An integrated circuit system in accordance with claim 3 wherein the input signal fed to each of said at least two circuits is derived from circuit means including at least one transistor and at least one diode connected in series with the base-emitter junction of said transistor, said series-connected transistor and diode being coupled to said one input terminal, and the input signal deriving circuit means and the reference voltage deriving means for each of said at least two circuits have the same number of active elements, connected respectively to said two input terminals, which affect the signal levels at said two input terminals in accordance with temperature changes.

5. An integrated circuit system in accordance with claim 4 wherein the change in potential drops across the active elements in said input signal deriving circuit means and the change in potential drops across the active elements in said reference voltage deriving means connected to the same one of said at least two circuits are approximately equal for the same change in temperature.

6. An integrated circuit system in accordance with claim 5 wherein each of said at least two circuits includes two transistors, each having emitter, base and collector terminals, means for interconnecting the emitter terminals of said two transistors, said base terminals being said two input terminals and one of said collector terminals being said at least one output terminal.

7. An integrated circuit system in accordance with claim 1 wherein the input signal fed to each of said at least two circuits is derived from circuit means including at least one transistor and at least one diode connected in series with the base-emitter junction of said transistor, said series-connected transistor and diode being coupled to said one input terminal, and the input signal deriving circuit means and the reference voltage deriving means for each of said at least two circuits have the same number of active elements, connected respectively to said two input terminals, which affect the signal levels at said two input terminals in accordance with temperature changes.

8. An integrated circuit system in accordance with claim 7 wherein the change in potential drops across the active elements in said input signal deriving circuit means and the change in potential drops across the active elements in said reference voltage deriving means connected to the same one of said at least two circuits are approximately equal for the same change in temperature.

9. An integrated circuit system in accordance with claim 8 wherein each of said at least two circuits includes two transistors, each having emitter, base and collector terminals, means for interconnecting the emitter terminals of said two transistors, said base terminals being said two input terminals and one of said collector terminals being said at least one output terminal.

10. An integrated circuit system in accordance with claim 1 wherein each of said at least two circuits includes two transistors, each having emitter, base and collector terminals, means for interconnecting the emitter terminals of said two transistors, said base terminals being said two input terminals and one of said collector terminals being said at least one output terminal.

11. An integrated circuit system in accordance with claim 10 wherein the input signal fed to each of said at least two circuits is derived from circuit means including at least one active element, and the input signal deriving circuit means and the reference voltage deriving means for each of said at least two circuits have the same number of active elements, connected respectively to said two input terminals, which affect the signal levels at said two input terminals in accordance with temperature changes.

12. An integrated circuit system in accordance with claim 11 wherein the change in potential drops across the active elements in said input signal deriving circuit means and the change in potential drops across the active elements in said reference voltage deriving means connected to the same one of said at least two circuits are approximately equal for the same change in temperature.

13. An integrated circuit system in accordance with claim 1 wherein the input signal fed to each of said at least two circuits is derived from circuit means including at least one active element, and the input signal deriving circuit means and the reference voltage deriving means for each of said at least two circuits have the same number of active elements, connected respectively to said two input terminals, which affect the signal levels at said two input terminals in accordance with temperature changes.

14. An integrated circuit system in accordance with claim 13 wherein the change in potential drops across the active elements in said input signal deriving circuit means and the change in potential drops across the active elements in said reference voltage deriving means connected to the same one of said at least two circuits are approximately equal for the same change in temperature.

15. An integrated circuit system in accordance with claim 1 wherein at least one of said at least two circuits includes two transistors, each having emitter, base and collector terminals, means for interconnecting the emitter terminals of said two transistors, said base terminals being said two input terminals and one of said collector terminals being said at least one output terminal, and further including clamping means coupled to the collector terminals of said two transistors for applying a clamping voltage thereto, and means connected to said clamping means for deriving a reference voltage from said single system power supply which causes said clamping means to change the clamping voltage at said collector terminals with a variation in temperature in the same direction as the input signal to said at least one of said at least two circuits changes with a variation in temperature.

16. An integrated circuit system comprising a single system power supply, a plurality of circuits all on the same semiconductor chip and all coupled to said single system power supply and being powered thereby, at least two of said circuits being fed by input signals from others of said circuits which input signals vary between two levels, said input signals varying with changes in temperature, each of said at least two circuits having two input terminals and at least one output terminal, means for feeding the input signal to each of said at least two circuits to one of the input terminals thereof such that the signal developed by each of said at least two circuits at the output terminal thereof is at a level dependent upon the relative magnitudes of the signals at said two input terminals, and at least two means for deriving at least two reference voltages from said single system power supply for application to respective ones of the second input terminals of said at least two circuits which reference voltages change with temperature in the same direction as the input signal levels fed to each of said at least two circuits.

17. An integrated circuit system in accordance with claim 16 wherein each of said at least two reference voltage deriving means includes at least one diode and one resistor connected in series across said single system power supply.

18. An integrated circuit system in accordance with claim 17 wherein each of said at least two reference voltage deriving means further includes a transistor having a base-emitter junction connected between the second input terminal of the respective one of said at least two circuits and said series-connected resistor and diode.

19. An integrated circuit system in accordance with claim 18 wherein the input signal fed to each of said at least two circuits is derived from circuit means including at least one transistor and at least one diode connected in series with the base-emitter junction of said transistor, said series-connected transistor and diode being coupled to said one input terminal, and the input signal deriving circuit means and the reference voltage deriving means for each of said at least two circuits have the same number of active elements, connected respectively to said two input terminals, which affect the signal levels at said two input terminals in accordance with temperature changes.

20. An integrated circuit system in accordance with claim 19 wherein the change in potential drops across the active elements in said input signal deriving circuit means and the change in potential drops across the active elements in said reference voltage deriving means connected to the same one of said at least two circuits are approximately equal for the same change in temperature.

21. An integrated circuit system in accordance with claim 19 wherein each of said at least two circuits includes two transistors, each having emitter, base and collector terminals, means for interconnecting the emitter terminals of said two transistors, said base terminals being said two input terminals and one of said collector terminals being said at least one output terminal.

22. An integrated circuit system in accordance with claim 16 wherein the input signal fed to each of said at least two circuits is derived from circuit means including at least one transistor and at least one diode connected in series with the base-emitter junction of said transistor, said series-connected transistor and diode being coupled to said one input terminal, and the input signal deriving circuit means and the reference voltage deriving means for each of said at least two circuits have the same number of active elements, connected respectively to said two input terminals, which affect the signal levels at said two input terminals in accordance with temperature changes.

23. An integrated circuit system in accordance with claim 22 wherein the change in potential drops across the active elements in said input signal deriving circuit means and the change in potential drops across the active elements in said reference voltage deriving means connected to the same one of said at least two circuits are approximately equal for the same change in temperature.

24. An integrated circuit system in accordance with claim 23 wherein each of said at least two circuits includes two transistors, each having emitter, base and collector terminals, means for interconnecting the emitter terminals of said two transistors, said base terminals being said two input terminals and one of said collector terminals being said at least one output terminal.

25. An integrated circuit system in accordance with claim 16 wherein each of said at least two circuits includes two transistors, each having emitter, base and collector terminals, means for interconnecting the emitter terminals of said two transistors, said base terminals being said two input terminals and one of said collector terminals being said at least one output terminal.

26. An integrated circuit system in accordance with claim 25 wherein the input signal fed to each of said at least two circuits is derived from circuit means including at least one active element, and the input signal deriving circuit means and the reference voltage deriving means for each of said at least two circuits have the same number of active elements, connected respectively to said two input terminals, which affect the signal levels at said two input terminals in accordance with temperature changes.

27. An integrated circuit system in accordance with claim 26 wherein the change in potential drops across the active elements in said input signal deriving circuit means and the change in potential drops across the active elements in said reference voltage deriving means connected to the same one of said at least two circuits are approximately equal for the same change in temperature.

28. An integrated circuit system in accordance with claim 16 wherein the input signal fed to each of said at least two circuits is derived from circuit means including at least one active element, and the input signal deriving circuit means and the reference voltage deriving means for each of said at least two circuits have the same number of active elements, connected respectively to said two input terminals, which affect the signal levels at said two input terminals in accordance with temperature changes.

29. An integrated circuit system in accordance with claim 28 wherein the change in potential drops across the active elements in said input signal deriving circuit means and the change in potential drops across the active elements in said reference voltage deriving means connected to the same one of said at least two circuits are approximately equal for the same change in temperature.

30. An integrated circuit system in accordance with claim 16 wherein at least one of said at least two circuits includes two transistors, each having emitter, base and collector terminals, means for interconnecting the emitter terminals of said two transistors, said base terminals being said two input terminals and one of said collector terminals being said at least one output terminal, and further including clamping means coupled to the collector terminals of said two transistors for applying a clamping voltage thereto, and means connected to said clamping means for deriving a reference voltage from said single system power supply which causes said clamping means to change the clamping voltage at said collector terminals with a variation in temperature in the same direction as the input signal to said at least one of said at least two circuits changes with a variation in temperature.

31. In an integrated circuit having a transistor having an input terminal and an output terminal, supply voltage means, resistance means connecting said output terminal to said supply voltage means and means for applying an input signal to said input terminal for switching the voltage at said output terminal between first and second levels, the level of said input signal varying in accordance with temperature, the improvement comprising clamping means powered by said voltage supply means connected between said voltage supply means and said output terminal for limiting the difference between the voltages at said input and output terminals, said clamping means being operative to clamp the voltage at said output terminal to a value which changes in the same direction as said input signal changes with a variation in temperature, said transistor having emitter, base and collector terminals, said base terminal being said input terminal and said collector terminal being said output terminal, said clamping means including a clamping transistor having emitter, base and collector terminals, said emitter terminal being connected to said output terminal, circuit means including diode means and resistor means coupled to said voltage supply means, and means connecting said base terminal of said clamping transistor to said circuit means.

* * * * *